US011382141B2

(12) United States Patent
Chang et al.

(10) Patent No.: US 11,382,141 B2
(45) Date of Patent: Jul. 5, 2022

(54) METHOD FOR PERFORMING ACTIONS BASED ON INTEGRITY CHECK BY USER AND USER EQUIPMENT PERFORMING ACTIONS BASED ON INTEGRITY CHECK

(71) Applicants: Sharp Kabushiki Kaisha, Sakai (JP); FG Innovation Company Limited, Tuen Mun (HK)

(72) Inventors: Ningjuan Chang, Shanghai (CN); Renmao Liu, Shanghai (CN)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 17/041,501

(22) PCT Filed: Dec. 26, 2018

(86) PCT No.: PCT/CN2018/123950
§ 371 (c)(1),
(2) Date: Sep. 25, 2020

(87) PCT Pub. No.: WO2019/184483
PCT Pub. Date: Oct. 3, 2019

(65) Prior Publication Data
US 2021/0051734 A1 Feb. 18, 2021

(30) Foreign Application Priority Data

Mar. 27, 2018 (CN) .......................... 201810261675.X

(51) Int. Cl.
*H04W 74/08* (2009.01)
*H04W 76/19* (2018.01)
(Continued)

(52) U.S. Cl.
CPC ....... *H04W 74/0833* (2013.01); *H04W 72/14* (2013.01); *H04W 76/19* (2018.02); *H04W 76/27* (2018.02); *H04W 80/02* (2013.01)

(58) Field of Classification Search
CPC . H04W 74/0833; H04W 76/19; H04W 76/27; H04W 72/14; H04W 80/02;
(Continued)

(56) References Cited

U.S. PATENT DOCUMENTS 10,667,323 B1* 5/2020 Shih .................. H04W 72/0493
2018/0324869 A1* 11/2018 Phuyal ................. H04W 72/14
(Continued)

OTHER PUBLICATIONS

NPL Document, "Introduction of Early data transmission in 36.331" Reno, USA Nov. 27-Dec. 1, 2017 (Year: 2017).*
(Continued)

*Primary Examiner* — Mewale A Ambaye
(74) *Attorney, Agent, or Firm* — Keating & Bennett, LLP

(57) ABSTRACT

The present invention provides a method performed by user equipment, a method performed by a base station, user equipment, and a base station. The method performed by user equipment includes: transmitting to a base station a Radio Resource Control (RRC) connection resume request; receiving an RRC response message transmitted by the base station and used as a response to the RRC connection resume request; in the case where the UE has transmitted the RRC connection resume request on the basis of Early Data Transmission (EDT), performing first security processing on the RRC response message; and in the case where the UE has not transmitted the RRC connection resume request on the basis of the EDT, performing second security processing on the RRC response message.

2 Claims, 6 Drawing Sheets

(51) Int. Cl.
*H04W 76/27* (2018.01)
*H04W 72/14* (2009.01)
*H04W 80/02* (2009.01)

(58) Field of Classification Search
CPC ......... H04W 74/0808; H04W 36/0033; H04W 76/10; H04W 28/12
See application file for complete search history.

(56) References Cited

U.S. PATENT DOCUMENTS

| | | | |
|---|---|---|---|
| 2019/0104553 A1* | 4/2019 | Johansson | H04L 1/12 |
| 2019/0141753 A1* | 5/2019 | Lin | H04W 74/0833 |
| 2019/0159260 A1* | 5/2019 | Charbit | H04L 5/0044 |
| 2020/0196264 A1* | 6/2020 | Shih | H04W 74/0833 |
| 2021/0307100 A1* | 9/2021 | Talebi Fard | H04W 76/30 |

OTHER PUBLICATIONS

Official Communication issued in International Patent Application No. PCT/CN2018/123950, dated Apr. 1, 2019.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.0.1, Jan. 2018, pp. 1-776.
Ericsson et al., "New WID on Even further enhanced MTC for LTE", 3GPP TSG RAN Meeting #75, RP-170732, Mar. 3-9, 2017, 4 pages.
Huawei et al., "New WID on Further NB-IoT enhancements", #3GPP TSG RAN Meeting #75, RP-170852, Mar. 6-9, 2017, 6 pages.
Huawei et al., "Remaining issues for EDT in the UP solution for eMTC and NB-IoT", 3GPP TSG-RAN WG2 Meeting #101, R2-1802217, Feb. 26-Mar. 2, 2018, pp. 1-6.
Huawei et al., "Introduction of Early data transmission in 36.331", 3GPP TSG-RAN2 Meeting #100, R2-1713183, Nov. 27-Dec. 1, 2017, 35 pages.
Ericsson, "Corrections and clarifications for MO EDT", 3GPP TSG-RAN WG2 #103bis, R2-1814332, Oct. 8-12, 2018, 4 pages.
Huawei et al., "Security issues for EDT in the UP solution for eMTC and NB-IoT", 3GPP TSG-RAN WG2 Meeting #101, R2-1802218, Feb. 26-Mar. 2, 2018, pp. 1-5.
Qualcomm Incorporated, "UL early data transmission", 3GPP TSG-RAN WG2 Meeting #99, R2-1708239, Aug. 21-25, 2017, 13 pages.

* cited by examiner

METHOD FOR PERFORMING ACTIONS BASED ON INTEGRITY CHECK BY USER AND USER EQUIPMENT PERFORMING ACTIONS BASED ON INTEGRITY CHECK

TECHNICAL FIELD

The present disclosure relates to the technical field of wireless communications, and more specifically, to a method performed by user equipment, a method performed by a base station, user equipment, and a base station, for security processing of a response message of an RRC connection resume request.

BACKGROUND

A new work item related to further enhancement of Narrow Band Internet of Things (NB-IoT) (see RP-170852: New WID on Further NB-IoT Enhancements) and a new work item related to even further enhancement of Machine Type Communication (MTC) (see non-patent literature: RP-170732: New WID on Even Further Enhanced MTC for LTE) were approved at the 3rd Generation Partnership Project (3GPP) RAN #75 plenary meeting held in March 2017. One of the objectives of these two research items is to enhance transmission of a small data packet service. The volume of data to be transmitted for a small data packet service within a period of time is relatively small, for example, 1,000 bits. Transmission of the data requires only one transmission block of the physical layer. However, in an existing mechanism, data transmission is performed only after setting up a connection to an air interface and entering into an RRC connected state, resulting in relatively large signaling overheads of small data packet transmission. A large data volume of a user terminal of MTC or NB-IoT results in larger signaling overheads, and in addition, the overly large signaling overheads result in unnecessary energy consumption of the user terminal. In order to transmit small data packets by using less signaling overheads and to achieve energy conservation of User Equipment (UE), it was proposed that the UE may perform data transmission without entering a Radio Resource Control (RRC) connected state in enhancement of small data transmission in Release 15. For example, small data is transmitted together with a random access message 3 in a random access procedure. However, in some cases, the UE needs to fall back from an ongoing small data transmission procedure to a conventional data transmission procedure, that is, the UE needs to enter, through an RRC connection setup/resume procedure, a connected state for data transmission. For example, a network side buffers more data of the UE that needs to be transmitted to the UE, the network side requests the UE in an ongoing small data transmission procedure to enter an RRC connected state so as to receive more downlink data. In this case, the UE needs to fall back to a conventional data transmission procedure. A technical solution referred to as a user plane optimization solution was proposed in NB-IoT or MTC technology of Release 14 and is used to reduce signaling overheads in switching from an RRC idle state to an RRC connected state. In the user plane based optimization solution, if the UE needs to use the small data transmission procedure, then different from an existing user plane optimization solution, the UE, during initiation of the small data transmission procedure, reactivates (or resumes) previously deactivated access stratum security.

The objective of the present disclosure is to solve the problem of security processing of UE switching from an RRC idle state to an RRC connected state.

SUMMARY

The present invention provides a method performed by user equipment, a method performed by a base station, user equipment, and a base station capable of solving the aforementioned problem.

According to a first aspect of the present invention, a method performed by User Equipment (UE) is provided, comprising: transmitting to a base station a Radio Resource Control (RRC) connection resume request; receiving an RRC response message transmitted by the base station and used as a response to the RRC connection resume request; in the case where the UE has transmitted the RRC connection resume request for Early Data Transmission (EDT), performing first security processing on the RRC response message; and in the case where the UE has transmitted the RRC connection resume request not for the EDT, performing second security processing on the RRC response message.

In the above-mentioned method, N bits in a Protocol Data Unit (PDU) header of a Packet Data Convergence Protocol (PDCP) layer are used to indicate whether the RRC response message is an RRC connection resume message or an RRC connection release message, wherein N is an integer greater than or equal to 1; in the EDT, early data is comprised in a message 3 for uplink transmission together with the RRC connection resume request.

In the above-mentioned method, in the first security processing, when receiving the PDCP PDU comprising the RRC response message, the PDCP layer directly performs security processing on the RRC response message; in the second security processing, the PDCP layer performs security processing on the basis of a result of processing the RRC response message performed by the RRC layer; the first security processing and the second security processing separately comprise decryption processing and/or integrity verification processing.

In the above-mentioned method, in the case where the first security processing is successful, the UE performs connection resume actions on the basis of the RRC connection resume message, wherein the connection resume actions comprise: stopping a timer T300; discarding stored UE access stratum context and a stored resume identity; performing a radio resource configuration process on the basis of received radio resource configurations; if cell reselection priority information and redirected carrier-specific offset information are stored, then discarding the stored cell reselection priority information and redirected carrier-specific offset information; if the RRC connection resume message comprises measurement configurations, then performing a measurement configuration procedure; if an access control timer is running, then stopping the running access control timer; entering an RRC connected state; indicating to an upper layer that a suspended RRC connection has been resumed; stopping a cell reselection process; considering a current cell to be a primary cell; and submitting an RRC connection resume complete message to a lower layer for transmission; in the case where the first security processing fails, the UE performs actions upon leaving the RRC connected state, and ends the RRC connection resume request procedure.

In the above-mentioned method, in the case where the first security processing fails, if the RRC response message is the RRC connection release message, then the RRC layer initiates an RRC connection reestablishment procedure, and if the RRC response message is the RRC connection resume message, then the RRC layer performs actions upon leaving the RRC connected state.

In the above-mentioned method, when the UE sets up a new RRC connection, if a Next-hop Chaining Count (NCC) is stored, then the stored NCC is discarded, and an RRC connection setup request message is transmitted.

In the above-mentioned method, when the UE performs actions upon leaving the RRC connected state, in the case where leaving the RRC connected state is not triggered by suspension of an RRC connection, the UE performs the following actions: if a Next-hop Chaining Count (NCC) is stored, then discarding the stored NCC.

According to a second aspect of the present invention, User Equipment (UE) is provided, comprising: a processor; and a memory, storing instructions, wherein when run by the processor, the instructions execute the methods described herein.

According to a third aspect of the present invention, a method performed by a base station is provided, comprising: receiving an RRC connection resume request transmitted by a wireless device (UE); and transmitting an RRC response message used as a response to the RRC connection resume request, wherein in the case where the RRC connection resume request is transmitted for Early Data Transmission (EDT), the UE performs first security processing on the RRC response message, and in the case where the RRC connection resume request is not transmitted for the EDT, the UE performs second security processing on the RRC response message.

According to a fourth aspect of the present invention, a base station is provided, comprising: a processor; and a memory, storing instructions, wherein when run by the processor, the instructions execute the methods described herein.

The method for user equipment, the method for a base station, the user equipment, and the base station provided by the present invention can reduce signaling overheads in a Radio Resource Control (RRC) connection setup/resume procedure, and can reduce the energy consumption of user equipment (a user terminal).

BRIEF DESCRIPTION OF THE DRAWINGS

The above and other features of the present disclosure will become more apparent with the following detailed description in conjunction with the accompanying drawings.

DETAILED DESCRIPTION

Figure 1:
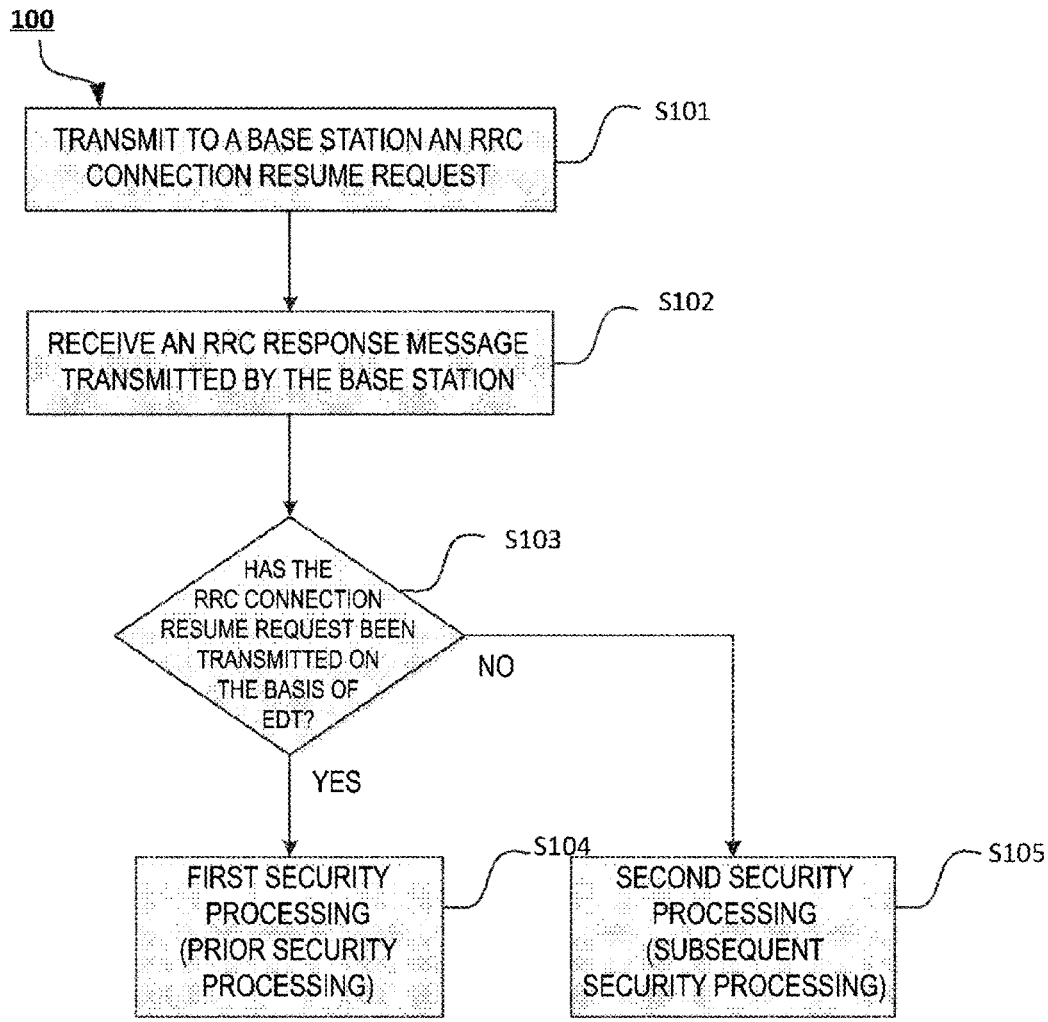
FIG. 1 shows a flowchart of a method 100 for User Equipment (UE) based on an embodiment of the present disclosure.

According to the following detailed description of exemplary embodiments of the present disclosure made in conjunction with the accompanying drawings, other aspects, advantages, and prominent features of the present disclosure will become apparent to those skilled in the art.

In the present disclosure, the terms "include" and "comprise" and derivatives thereof mean inclusion without limitation; the term "or" may have an inclusive meaning and means "and/or."

In the present specification, the following various embodiments for describing the principles of the present disclosure are merely illustrative, and should not be interpreted in any way as limiting the scope of the disclosure. The following description with reference to the accompanying drawings is used to facilitate full understanding of the exemplary embodiments of the present disclosure defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present disclosure. In addition, the description of the known function and structure is omitted for clarity and simplicity. In addition, the same reference numerals are used for similar functions and operations throughout the figures.

A plurality of embodiments according to the present disclosure are specifically described below by using an LTE mobile communications system and its subsequent evolved versions as an exemplary application environment. However, it should be noted that the present disclosure is not limited to the following embodiments, but may be applied to other wireless communication systems such as an NB-IoT system and an MTC system, and may also be applied to a 5G next-generation wireless communication system New Radio (NR).

In the present disclosure, a base station may be a base station of any type, including a Node B, an evolved Node B (eNB), a base station gNB in a 5G communication system, a micro base station, a picocell base station, a macro base station, a home base station, etc.; the cell may also be a cell covered by any type of base station described above. UE can refer to NB-IoT UE, Bandwidth-reduced Low-complexity (BL) UE, UE in enhanced coverage, or other UE such as 5G NR UE. In the following embodiments of the present disclosure, indicate/indication and notify/notification or inform/information can be interchanged.

Different embodiments can also be combined with each other for operation.

Firstly, some concepts involved in the present disclosure are described below. It is worth noting that some names in the following description are merely illustrative of examples rather than limiting, and other names may be used.

Random Access Response (RAR): a second message in a random access procedure. After receiving a random access preamble of UE, a base station responds to the reception of the random access preamble by transmitting a random access response message. The random access response message includes a time advance field, an uplink grant field, a UE identity field, etc.

Message 3: a third message in a random access procedure. In the present disclosure, the message 3 refers generally to uplink transmission transmitted by the UE on an uplink resource indicated by the uplink grant included in the RAR. For example, in an RRC connection setup procedure, a corresponding RRC message in the message 3 is an RRC connection setup request message, and in an RRC connection resume procedure, a corresponding RRC message in the message 3 is an RRC connection resume request message.

Message 4: a downlink message used as a response to the message 3 in the random access procedure, where the downlink message is transmitted by the base station to the UE. The message 4 may include a random access contention resolution identity used by the UE for random access contention resolution so as to determine whether current random access is successful. The message 4 may also include a downlink RRC message used as a response to an RRC message in the message 3. For example, when the RRC message in the message 3 is an RRC connection setup request message, an RRC message included in the message 4 may be an RRC connection setup message or an RRC connection rejection message; and when the RRC message in the message 3 is an RRC connection resume request message, the RRC message included in the message 4 may be an RRC connection resume message or an RRC connection rejection message.

User Plane Optimization Scheme

In practice, a communication system earlier than that in R15 supports two optimized data transmission schemes so as to reduce signaling overheads in data transmission and energy consumption of UE. The two data transmission schemes are referred to as control plane cellular evolved packet service optimization (cp-CIoT-EPS-Optimization) and user plane cellular evolved packet service optimization (up-CIoT-EPS-Optimization). In the control plane cellular evolved packet service optimization scheme, data of an application layer is used as a data packet of a Non Access Stratum (NAS), and is included in a Signaling Radio Bearer (SRB) of a control plane for transmission. This scheme can be referred to as a control plane optimization scheme or a control plane scheme for short. In the user plane cellular evolved packet service optimization scheme, as data transmission in a conventional system, data of an application layer is transmitted on a (user) Data Radio Bearer (DRB) in the RRC connected state. However, after completion of data transmission, UE and an eNB suspend an RRC connection (indicated by an RRC connection release message including a suspension indication); UE context is stored; and the UE enters into an RRC idle state. When the UE is to perform data transmission, the UE initiates an RRC connection resume procedure to the eNB (in this procedure, the UE transmits to the base station an RRC connection resume request message so as to initiate connection resumption; the base station transmits to the UE an RRC connection resume message so as to instruct the UE to resume the RRC connection; and then the UE feeds an RRC connection resume complete message back to the base station for response). Because the UE context is stored in the UE and the eNB, this procedure can resume the RRC connection, the DRB(s), and the security of the UE and the eNB without re-setting up an RRC connection, DRB(s), and security. This scheme can also be referred to as a user plane optimization scheme or a user plane scheme for short. Although the RRC idle state that UE stores an UE context is also called "RRC idle state", but it can be considered as an intermediate state between the RRC idle state and the RRC connected state. In the 5G NR system, this intermediate state can be considered as an RRC inactive state (RRC_inactive) defined thereby.

In the user plane scheme of Release 14, after having transmitted the RRC connection resume request message (the message 3), the UE initiating the RRC connection resume procedure waits to receive the RRC connection resume message (the message 4). Generally, after being received by the UE, a downlink data packet including an RRC message is processed by a physical layer and a layer 2, and is then submitted to an RRC layer of the UE for processing. The processing performed by the L2 includes processing performed by a Medium Access Control (MAC) layer, processing performed by a Radio Link Control (RLC) layer, and processing performed by a Packet Data Convergence Protocol (PDCP) layer. Security processing including decryption and/or integrity verification is performed at the PDCP layer. When the UE receives the RRC connection resume message, during the processing performed by the PDCP layer, security processing such as integrity verification is not performed, but a PDCP Service Data Unit (SDU) including the RRC connection resume message is directly submitted to the RRC layer. This is because security has not yet been activated (or resumed), and therefore integrity verification cannot be performed. The RRC layer performs processing, including reactivation of security, according to the content of the RRC message in the message 4, uses a Next-hop Chaining Count (nextHopChainingCount, NCC/NHCC) indicated by the RRC connection resume message to update a security key KeNB, and further derives an integrity key KRRCint associated with a previously configured integrity algorithm. After this step, the RRC requests the PDCP layer to verify the RRC connection resume message by using the previously configured integrity algorithm and the KRRCint. If the integrity verification of the RRC connection resume message fails, then the UE performs actions upon leaving the RRC connected state (see section 5.3.12 of 3GPP technical specification 36.331 for the performing, by the UE, actions upon leaving the RRC connected state). That is, it is considered that the UE may be subjected to a security attack. Then the RRC connection resume procedure ends, and the UE directly enters into an RRC idle state. If the integrity verification of the RRC connection resume message is successful, then the UE continues to execute the content of the RRC connection resume message, and enters the RRC connected state. Therefore, in the integrity verification of the RRC connection resume message in an existing mechanism, the data packet firstly reaches the RRC layer, and then returns to the PDCP layer for processing. In the present disclosure, this verification method is referred to as subsequent security processing (also referred to as second security processing in the present disclosure). This is different from processing of other RRC messages transmitted on an SRB1 in the existing mechanism. In security processing of other SRB1 RRC messages, when the PDCP layer receives the data packet, security processing (decryption and integrity verification) is firstly performed. Only if the integrity verification is successful, then the RRC message is submitted to the RRC layer for processing. If the integrity verification fails, then the PDCP layer transmits an integrity verification failure indication to the RRC, and discards the RRC message. In the present disclosure, this verification method is referred to as prior security processing (also referred to as first security processing in the present disclosure). In implementation, for uplink data, the security includes encryption and/or integrity protection. For downlink data, the security includes decryption and/or integrity verification. The present disclosure mainly discusses the latter.

Early Data Transmission (EDT)

A small data transmission optimization scheme in R15 is based on the above-mentioned two optimization schemes, and includes further optimization related to the characteristics of small data transmission. For uplink data transmission, optimization is mainly related to small data transmitted along with the message 3 in the random access procedure. Compared with a conventional data transmission method, this optimization method can complete data transmission at an earlier time point. Therefore, this optimization method is referred to as early data transmission. In the present disclosure, small data (or small packet) may be equivalent to early data. The UE indicates, by using an EDT-specific PRACH transmission resource or an EDT-specific random access preamble in the random access procedure, to the base station that the UE is to perform EDT transmission.

If an EDT procedure is based on the user plane scheme, then user data and the RRC message are multiplexed and assembled into the same MAC Protocol Data Unit (PDU) at the MAC layer for transmission. The user data is transmitted through the DRB, and the RRC message is transmitted through an SRB0 (in another implementation, the RRC message can also be transmitted through the SRB1). Therefore, when triggering the EDT procedure, the UE needs to resume (or (re)activate) the DRB and the security, and apply radio configuration to all protocol layers before RRC suspension. Resuming of the security in this RRC procedure by the UE is based on an NCC acquired in a previous RRC connection procedure so as to derive new security keys (including an encryption key and an integrity key). Furthermore, the NCC is acquired from an RRC connection release message for releasing a UE RRC connection so as to cause the UE to enter the idle state or the RRC inactive state in which the RRC connection is suspended in the previous RRC connection procedure.

The RRC procedure of EDT based on the user plane scheme is briefly described below:

1. When the UE RRC initiates EDT, the SRB1 and the DRB are resumed, and the security is resumed on the basis of the NCC. The UE performs uplink transmission on a resource corresponding to the uplink grant included in the RAR by multiplexing the small data together with the RRC message in message 3. When the user plane scheme is used, the RRC message refers to the RRC connection resume request message (RRCconnectionresumerequest).

2. After the base station receives the message 3 including the small data, if no additional data transmission exists, then the base station can inform, by transmitting a message 4 (the RRC connection release message), the UE that the data transmission is completed, and the RRC idle state can be maintained. Due to a decision from a network side, or if additional data needs to be transmitted, then the base station may instruct, by transmitting another message 4 (RRC connection resume), the UE to enter the RRC connected state.

3. If the message 4 received by the UE is the RRC connection release message, then it is considered that the small data transmission is completed, and the UE performs the actions upon leaving the RRC connected state, and re-enters the RRC idle state. If the message 4 received by the UE is the RRC connection resume message, then the UE executes the content of the RRC connection resume message and enters into the RRC connected state.

In the above-mentioned steps, if the message 4 is an RRC connection release message, then the message may be subjected to both encryption and integrity protection; if the message 4 is an RRC connection resume message, then the message may be subjected to encryption and/or integrity protection. Different from an RRC connection resume process in the existing mechanism, in the above-mentioned procedure, before receiving the message 4, the UE has reactivated a security mechanism. Therefore, when the UE PDCP layer receives the PDCP PDU including the message 4, it is feasible for the UE PDCP layer to perform prior security processing on the RRC message in the message 4. In the present disclosure, solutions are provided for security processing methods (prior security processing or subsequent security processing) for the RRC message in the message 4 and processing procedures of the different security processing methods. The following embodiments provide specific implementations for the security processing of the message 4 in the above-mentioned procedures. In the present disclosure, the integrity verification is also referred to as integrity protection check.

A method performed by User Equipment (UE) of the present disclosure is described below. As an example, FIG. 1 shows a flowchart of a method 100 for User Equipment (UE) based on an embodiment of the present disclosure.

In step S101, User Equipment (UE) transmits to a base station a Radio Resource Control (RRC) connection resume request.

In step S102, the base station responds to the RRC connection resume request of the User Equipment (UE), and transmits RRC response information thereto. The User Equipment (UE) receives the RRC response information transmitted by the base station.

In step S103, it is determined whether the User Equipment (UE) has transmitted the RRC connection resume request for Early Data Transmission (EDT).

In the case where a determination result is "Yes" in step S103, namely, in the case where the User Equipment (UE) has transmitted the RRC connection resume request for Early Data Transmission (EDT), step S104 is performed. In step S104, first security processing (namely, prior security processing) is performed.

In addition, in the case where the determination result is "No" in step S103, namely, in the case where the User Equipment (UE) has transmitted the RRC connection resume request not for of Early Data Transmission (EDT), step S105 is performed. In step S105, second security processing (namely, subsequent security processing) is performed.

In the first security processing (namely, the prior security processing), when receiving a PDCP PDU including an RRC response message, a PDCP layer directly performs security processing on the RRC response message. For example, in the first security processing, when the PDCP layer receives a data packet including the RRC response message, security processing (decryption and/or integrity verification) is firstly performed. Only if the integrity verification is successful, then the RRC message is submitted to an RRC layer for processing. If the integrity verification fails, then the PDCP layer transmits an integrity verification failure indication to RRC, and discards the RRC message.

In the second security processing (namely, the subsequent security processing), the PDCP layer performs security processing on the basis of a result processing the RRC response message performed by the RRC layer. For example, in the second security processing, when the UE receives the RRC connection resume message, during the processing performed by the PDCP layer, security processing such as integrity verification is not performed, but a PDCP Service Data Unit (SDU) including the RRC connection resume message is directly submitted to the RRC layer. The RRC layer performs processing, including reactivation of security, according to the RRC message in the message 4, uses a Next-hop Chaining Count (nextHopChainingCount, NCC/NHCC) indicated by the RRC connection resume message to update a security key KeNB, and further derives an integrity key KRRCint associated with a previously configured integrity algorithm. Then, the RRC requests the PDCP layer to verify the RRC connection resume message by using the previously configured integrity algorithm and the KRRCint. If the integrity verification of the RRC connection resume message fails, then the UE performs actions upon leaving the RRC connected state.

For example, the above-mentioned first security processing and second security processing separately include decryption processing and/or integrity verification processing, but are not limited to the above-mentioned decryption processing and integrity verification processing. With the development of wireless communication technology and communication standards, other security processing may also be included.

Figure 2:
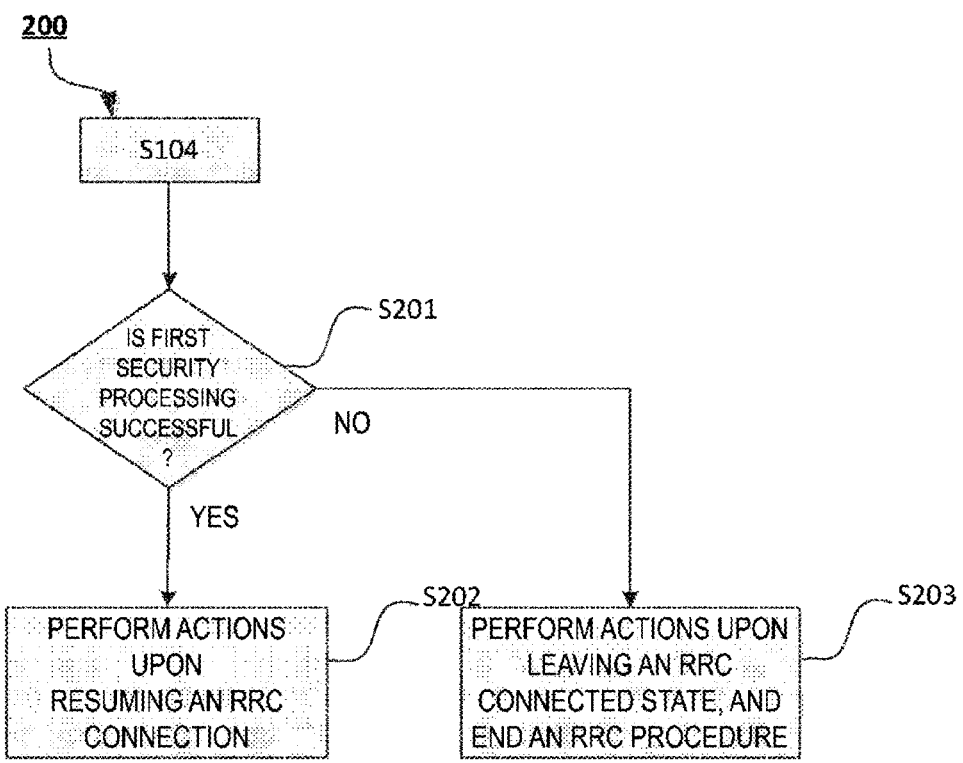
FIG. 2 shows a flowchart of a processing process 200 of first security processing.

In addition, as an example, FIG. 2 shows a flowchart of a processing process 200 of first security processing.

In step S201, it is determined whether first security processing is successful. For example, it is determined whether decryption processing and/or integrity verification processing is successful.

In the case where it is determined that the first security processing is successful (that is, the decryption processing and/or the integrity verification processing is successful) in step S201, step S202 is performed. In step S202, User Equipment (UE) performs connection resume actions on the basis of an RRC connection resume message, where the connection resume actions include but are not limited to: stopping a timer T300; discarding stored UE access stratum context and a stored resume identity; performing a radio resource configuration process on the basis of received radio resource configurations; if cell reselection priority information and redirected carrier-specific offset information are stored, then discarding the stored cell reselection priority information and redirected carrier-specific offset information; if the RRC connection resume message includes measurement configurations, then performing a measurement configuration procedure; if an access control timer is running, then stopping the running access control timer; entering an RRC connected state; indicating to an upper layer that a suspended RRC connection has been resumed; stopping a cell reselection process; considering a current cell to be a primary cell; and submitting an RRC connection resume complete message to a lower layer for transmission.

In the case where it is determined that the first security processing fails (that is, the decryption processing and/or the integrity verification processing fails) in step S201, step S203 is performed. In step S203, the User Equipment (UE) performs actions upon leaving the RRC connected state, and ends an RRC procedure such as an RRC connection resume request procedure.

Figure 3:
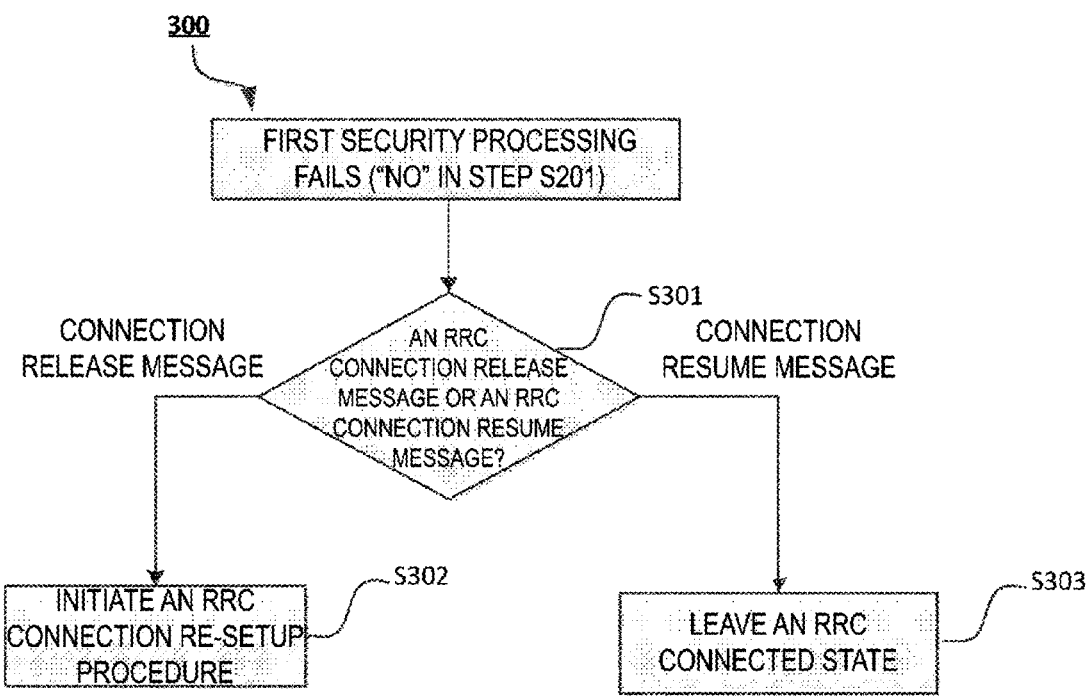
FIG. 3 shows a flowchart of another processing process 300 for the case in which the first security processing fails ("No" in step S201 of FIG. 2)

In addition, as an example, FIG. 3 shows a flowchart of another processing process 300 for the case in which the first security processing fails (equivalent to "No" in step S201 of FIG. 2).

In step S301, it is determined whether an RRC response message is an RRC connection release message or an RRC connection resume message.

In step S301, in the case where it is determined that the RRC response message is the RRC connection release message, step S302 is performed. In step S302, an RRC layer initiates an RRC connection reestablishment procedure.

In addition, in step S301, in the case where it is determined that the RRC response message is the RRC connection resume message, step S303 is performed. In step S303, the RRC layer performs actions upon leaving an RRC connected state.

For example, as described in detail in the following embodiments, the RRC layer performs different processing with respect to failures of integrity verification of different messages 4. For example, if the message 4 is an RRC connection release message, then when an integrity verification failure indication of a PDCP layer is received, the RRC layer initiates an RRC connection reestablishment procedure, and optionally, a timer T300 is stopped. If the message 4 is an RRC connection resume message, then when the integrity verification failure indication of the PDCP layer is received, the RRC layer performs actions upon leaving an RRC connected state, namely, the UE directly enters into an RRC idle state (or an RRC inactive state).

Specific embodiments of the present disclosure are described in detail below. In addition, as described above, the embodiments of the present disclosure are exemplary descriptions for facilitating understanding of the present invention, and are not intended to limit the present invention.

Embodiment 1

In this embodiment, UE performs prior security processing on an RRC connection resume message in an EDT procedure. That is, when a UE PDCP layer receives the RRC connection resume message, decryption and/or integrity verification is firstly performed, and when the decryption and/or the integrity verification is successful, the message is submitted to an RRC layer. Subsequent security processing is still performed on an RRC connection resume message in a non-EDT procedure. That is, depending on whether the RRC connection resume message is from the EDT procedure, the UE performs different security processing methods.

In the case of EDT, when the RRC connection resume message is transmitted, security is resumed (or referred to as "reactivated"). The integrity verification is performed before the RRC receives the message. Optionally, the RRC connection resume message is encrypted. Except for the EDT, when the RRC connection resume message is transmitted, the security is suspended. The integrity verification is performed after the RRC layer receives the message.

In an implementation, when the UE PDCP layer receives from a lower layer a PDCP PDU for an SRB, integrity verification is performed, and a result that the integrity verification fails/is successful is indicated to the RRC layer; optionally, a corresponding RRC message is submitted to the RRC layer. When receiving the RRC connection resume message, the RRC layer firstly determines that the received RRC connection resume message is a response to an RRC connection resume request message for the EDT, and if the PDCP layer indicates that the integrity verification of the RRC connection resume message fails, then the UE performs actions upon leaving an RRC connected state and ends the RRC procedure. If the received RRC connection resume message is a response to the RRC connection resume request message for the EDT, and if the integrity verification of the RRC connection resume message is successful, then the UE performs relevant actions according to the content of the RRC connection resume message (see section 5.3.3.4a of 3GPP technical specification 36.331f01). For example, the actions include one or more of the following:

stopping a timer T300;

discarding stored UE access stratum context and a stored resume identity (resumeidentity);

performing a radio resource configuration process according to received radio resource configurations;

if cell reselection priority information and redirected carrier-specific offset information are stored, then discarding the stored cell reselection priority information and redirected carrier-specific offset information;

if the RRC resume message includes measurement configurations, then performing a measurement configuration procedure;

if an access control timer (such as a T302, a T303, a T305, a T306, a T308, etc.) is running, then stopping the running access control timer;

entering an RRC connected state;

indicating to an upper layer that a suspended RRC connection has been resumed;

stopping a cell reselection process;

considering a current cell to be a primary cell; and submitting an RRC connection resume complete message to a lower layer for transmission.

In an implementation, the UE still performs subsequent security processing on the RRC connection resume message in the non-EDT procedure. That is, when the RRC layer receives the RRC connection resume message, if the received RRC connection resume message is not a response to the RRC connection resume request message for the EDT (or referred to as excluding the case in which the received RRC connection resume message is a response to the RRC connection resume request message for the EDT), then after resuming security and deriving an integrity protection key, the RRC layer requests the PDCP layer to verify the RRC connection resume message by using a previously configured security algorithm and the derived integrity protection key. If the integrity verification of the RRC connection resume message fails, then the UE performs actions upon leaving the RRC connected state, and ends the RRC procedure.

Embodiment 2

In this embodiment, UE performs prior security processing on an RRC connection resume message in an EDT procedure.

In the EDT procedure, two different messages 4 are transmitted through an SRB1, namely, an RRC connection resume message and an RRC connection release message.

In this embodiment, no distinction exists between processing with respect to failures of integrity verification of these two messages 4, that is, the same processing method is used. Therefore, an RRC layer does not need to determine whether the message 4 is an RRC connection resume message or an RRC connection release message. When a UE PDCP layer receives from a lower layer a PDCP PDU for an SRB, integrity verification is performed. If the integrity verification fails, then the UE PDCP layer indicates to the RRC layer that the integrity verification fails. After the RRC layer receives the indication from the PDCP layer, actions upon leaving an RRC connected state are performed, and the current RRC procedure ends. Optionally, if the integrity verification fails, then the PDCP layer discards the PDCP PDU. That is, in the EDT procedure (when the RRC connection resume message or the RRC connection release message is received), upon the RRC layer receives the integrity check failure indication from the PDCP layer, then the actions upon leaving the RRC connected state are performed, and the current RRC procedure ends. The foregoing description "in the EDT procedure" may also be referred to as "if the RRC message is a response to the RRC connection resume request message for the EDT," or may be referred to as "in an RRC connection resume procedure for the EDT," or "while a T300 is running" For the description "while a T300 is running," optionally, when the integrity check failure indication for the SRB and from the PDCP layer is received, and while the T300 is not running, the UE RRC layer initiates an RRC connection reestablishment procedure.

Optionally, if the PDCP layer fails to decrypt the PDCP PDU including a message 4, then a decryption failure is indicated to the RRC layer. After the RRC receives the decryption failure indication from the PDCP, the actions upon leaving the RRC connected state are performed, and the current RRC procedure ends.

Embodiment 3

In this embodiment, UE performs prior security processing on an RRC connection resume message in an EDT procedure.

In the EDT procedure, two different messages 4 are transmitted through an SRB1, namely, an RRC connection resume message and an RRC connection release message. Different from embodiment 2, in this embodiment, processing with respect to failures of integrity verification of one of these two messages 4 is different from processing with respect to failures of integrity verification of the other one of these two messages 4. Therefore, an RRC layer needs to determine whether the message 4 is an RRC connection resume message or an RRC connection release message.

In an implementation, if a PDCP layer successfully decrypts the message 4, then even if the integrity verification of the message 4 fails, the PDCP layer still submits to the RRC layer a data packet including the message 4. Therefore, the RRC layer can determine, by parsing the content of an RRC message in the message 4, whether the message 4 is an RRC connection resume message or an RRC connection release message.

Figure 4:
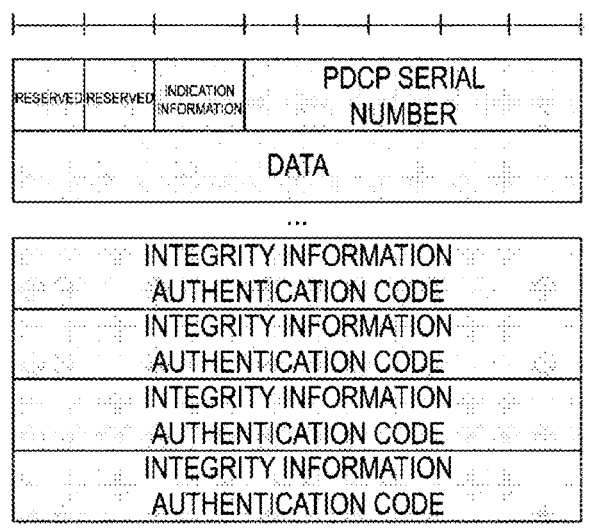
FIG. 4 shows an example in which a bit in a PDCP PDU header is used to indicate the type of a message 4.

In another implementation, a PDCP PDU header includes a piece of indication information. The indication information may be used to indicate the type of the message 4 included in the PDCP PDU. For example, the indication information indicates whether the message 4 included in the PDCP PDU is an RRC connection release message or an RRC connection resume message. If the integrity verification of the message 4 fails, then the PDCP layer discards the PDCP PDU, and indicates to the RRC layer the message type included in the PDCP PDU header. Therefore, the RRC layer can determine, according to the message type indication received from the PDCP layer, whether the message 4 is an RRC connection resume message or an RRC connection release message. FIG. 4 shows an example in which a bit in a PDCP PDU header is used to indicate the type of a message 4. As shown in FIG. 4, the third bit in the PDCP PDU header is used to indicate the type of the message 4 included in a PDCP PDU. If the bit is configured to be 1, then the message 4 included in the PDCP PDU is an RRC connection resume message, and if the bit is configured to be 0, then the message 4 included in the PDCP PDU is an RRC connection release message. Alternatively, if the bit is configured to be 0, then the message 4 included in the PDCP PDU is an RRC connection resume message, and if the bit is configured to be 1, then the message 4 included in the PDCP PDU is an RRC connection release message. FIG. 4 is only exemplary, and the present disclosure does not restrict an indicator bit to the third bit in FIG. 4. For example, the indicator bit may also be the first bit, the second bit, or another bit. Optionally, in this implementation, the actions of indicating, by the PDCP, to the RRC layer the type of the message included in the PDCP PDU header may also be performed before the integrity verification, that is, a condition for performing the actions may not be restricted to the failure of the integrity verification. The message types in this embodiment are not restricted to the above-mentioned two types, and more than two types may be provided. In this case of more than two types, more than one bit is needed to indicate the message type.

The message type indication information is not restricted to be included in a PDCP PDU, and can also be included in another layer 2 PDU or PDU header such as a MAC PDU or an RLC PDU. In this case, the message type indication information is indicated to the RRC layer by a MAC layer or an RLC layer.

In another implementation, different from the previous implementation, if the decryption and/or integrity verification of the message 4 fails, then the UE PDCP layer indicates to the RRC layer the message type included in the PDCP PDU header. Therefore, the RRC layer can determine, according to the message type indication received from the PDCP layer, whether the message 4 is an RRC connection resume message or an RRC connection release message.

For example, the different processing with respect to failures of integrity verification of different messages 4 performed by the RRC layer can be as follows: if the message 4 is an RRC connection release message, then when an integrity verification failure indication of the PDCP layer is received, the RRC layer initiates an RRC connection reestablishment procedure, and optionally, a timer T300 is stopped; if the message 4 is an RRC connection resume message, then when the integrity verification failure indication of the PDCP layer is received, the RRC layer performs actions upon leaving an RRC connected state, namely, the UE directly enters into an RRC idle state (or an RRC inactive state).

Embodiment 4

In this embodiment, UE still performs subsequent security processing on an RRC connection resume message in an EDT procedure.

As described above, two types of RRC messages are transmitted through an SRB1, namely, an RRC connection resume message and an RRC connection release message. In this embodiment, prior security processing is performed on the RRC connection release message. Therefore, when a PDCP layer receives a PDCP PDU including a message 4, it needs to be determined whether to perform prior security processing on the PDU or to wait for an indication from an upper layer before performing subsequent security processing.

An implementation is the same as that in embodiment 3, that is, a PDCP PDU header includes a piece of indication information. The indication information may be used to indicate the type of the message 4 included in the PDCP PDU. For example, the indication information indicates whether the message 4 included in the PDCP PDU is an RRC connection release message or an RRC connection resume message. Alternatively, the indication information may be used to indicate whether the PDCP PDU performs prior security processing or subsequent security processing. The PDCP layer determines, according to the indication information, whether security is applicable (namely, whether to perform prior security processing) when a PDCP PDU including the message 4 is received. For example, a bit in the PDCP PDU header is used to indicate whether the security is applicable to the PDCP PDU. If the bit is configured to be 1, then the security is applicable to the PDCP PDU (that is, prior security processing is performed), and if the bit is configured to be 0, then the security is not applicable to the PDCP PDU (that is, prior security processing is not performed). Alternatively, if the bit is configured to be 0, then the security is applicable to the PDCP PDU (that is, prior security processing is performed), and if the bit is configured to be 1, then the security is not applicable to the PDCP PDU (that is, prior security processing is not performed).

Embodiment 5

In this embodiment, subsequent security processing is performed on all messages 4 on an SRB1, that is, subsequent security processing is also performed on an RRC connection release message.

When UE RRC receives an RRC connection release message, if the RRC connection release message is a response to an RRC connection resume request message, then the RRC requests a PDCP layer to perform integrity verification on the message by using a previous security algorithm and a derived integrity key. If the integrity verification fails, then the RRC layer performs actions upon leaving an RRC connected state, and ends the RRC procedure. Otherwise, the RRC layer executes the content of the RRC connection release message (see section 5.3.8.3 of 3GPP technical specification 36.331 for the executing, by UE, the content of the RRC connection release message).

Embodiment 6

In this embodiment, a method for processing a security parameter in an RRC connection setup procedure is provided.

When an RRC connection setup procedure is initiated, if UE is not resuming an RRC connection, then the UE performs the following actions:
 if an NCC is stored, then discarding the stored NCC; and
 initiating transmission of an RRC connection setup message.

In the above-mentioned actions, the discarding may also be replaced with releasing or clearing. The description "if UE is not resuming an RRC connection" can also be described as "if UE is establishing a new RRC connection."

Through the processing on an NCC on the UE in this embodiment, synchronization of security can be maintained between a network side and the UE, so that an RRC process failure caused by using an invalid NCC in a next RRC connection resume procedure is avoided, and signaling overheads and a data transmission delay are further avoided.

Embodiment 7

In this embodiment, a method for processing a security parameter upon leaving an RRC connected state is provided.

When actions upon leaving the RRC connected state are performed, if the leaving the RRC connected state is not triggered by suspension of an RRC connection, then UE performs the following action:

if an NCC is stored, then discarding the stored NCC.

In the above-mentioned action, the discarding may also be replaced with releasing or clearing. The "if the leaving the RRC connected state is not triggered by suspension of an RRC connection" may include, for example, the case in which the leaving the RRC connected state is triggered by the failure of the integrity verification described in the above-mentioned embodiments and the like. Optionally, in an NR system, the leaving the RRC connected state described in the present disclosure may also be leaving an RRC inactive state or entering/returning to an RRC idle state. Through the processing on an NCC on the UE in this embodiment, the UE discards the stored NCC, so that an RRC process failure caused by using an invalid NCC in a next RRC connection resume procedure is avoided, and signaling overheads and a data transmission delay are further avoided.

The embodiments described in the present disclosure are also applicable to an NR system. However, it is worth noting that in the NR system, the type of the message 4 is not restricted to RRC connection resume and RRC connection release, and may also be other RRC messages such as an RRC connection release message. The names of messages in the NR system may be different from the names of messages in an LTE system. However, these differences do not limit the present disclosure.

Figure 5:
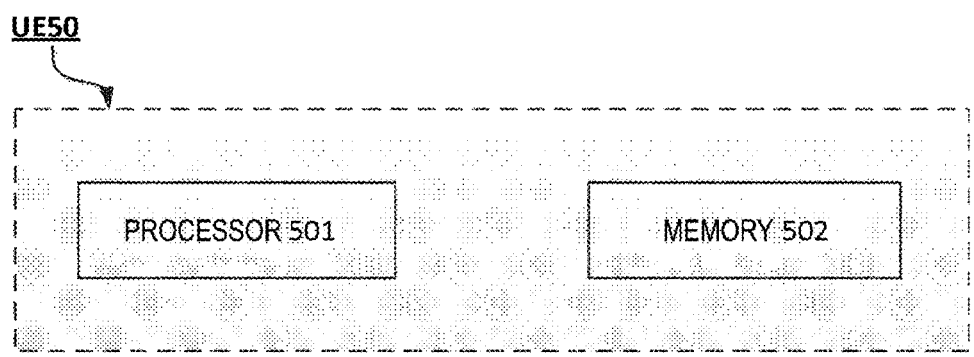
FIG. 5 shows a block diagram of user equipment 50 according to an embodiment of the present disclosure.

FIG. 5 shows a block diagram of user equipment 50 according to an embodiment of the present disclosure. As shown in FIG. 5, the user equipment 50 includes a processor 501 and a memory 502. The processor 501 may include, for example, a microprocessor, a microcontroller, an embedded processor, etc. The memory 502 may include, for example, a volatile memory (for example, a Random Access Memory (RAM)), a Hard Disk Drive (HDD), a non-volatile memory (for example, a flash memory), or other memory systems. Program instructions are stored on the memory 502. The instructions, when run by the processor 501, can execute the aforementioned method performed by user equipment described in detail in the present disclosure.

Figure 6:
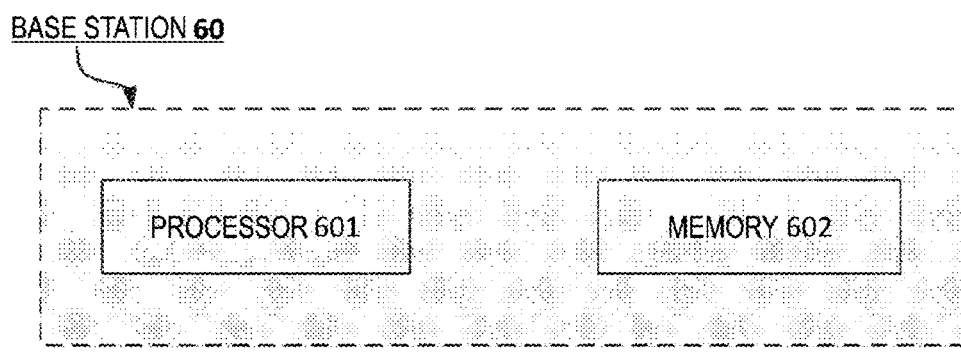
FIG. 6 shows a block diagram of a base station 60 according to an embodiment of the present disclosure.

FIG. 6 shows a block diagram of a base station 60 according to an embodiment of the present disclosure. As shown in FIG. 6, the base station 60 includes a processor 601 and a memory 602. As described above, in the present disclosure, the base station 60 may be a base station of any type, including, but not limited to, a Node B, an evolved Node B (eNB), a base station gNB in a 5G communication system, a micro base station, a picocell base station, a macro base station, a home base station, etc. The processor 601 may include, for example, a microprocessor, a microcontroller, an embedded processor, etc. The memory 602 may include, for example, a volatile memory (for example, a Random Access Memory (RAM)), a Hard Disk Drive (HDD), a non-volatile memory (for example, a flash memory), or other memory systems. Program instructions are stored on the memory 602. The instructions, when run by the processor 601, can execute the aforementioned method performed by a base station described in detail in the present disclosure.

A program running on a device according to the present disclosure may be a program enabling, through a Central Processing Unit (CPU), a computer to implement the functions of the embodiments of the present disclosure. The program or information processed by the program can be stored temporarily in a volatile memory (for example, a Random Access Memory (RAM)), a Hard Disk Drive (HDD), a non-volatile memory (for example, a flash memory), or other memory systems.

The program for implementing the functions of the embodiments of the present disclosure may be recorded on a computer-readable recording medium. The corresponding functions can be achieved by reading programs recorded on the recording medium and executing these programs by the computer system. The so-called "computer system" may be a computer system embedded in the device, which may include operating systems or hardware (e.g., peripherals). The "computer-readable recording medium" may be a semiconductor recording medium, an optical recording medium, a magnetic recording medium, a short-time dynamic memory program, or any other recording medium readable by a computer.

Various features or functional modules of the device used in the foregoing embodiments may be implemented or executed by circuits (e.g., monolithic or multi-chip integrated circuits). Circuits designed to execute the functions described in the present specification may include general-purpose processors, Digital Signal Processors (DSPs), Application Specific Integrated Circuits (ASICs), Field Programmable Gate Arrays (FPGAs) or other programmable logic devices, discrete gates or transistor logic, discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices mounted indoors or outdoors, such as AV equipment, kitchen equipment, cleaning equipment, air conditioner, office equipment, vending machines, and other household appliances, may be used as terminal devices or communications devices.

The embodiments of the present disclosure have been described in detail above with reference to the accompanying drawings. However, the specific structures are not limited to the above-mentioned embodiments. The present disclosure also includes any design modifications that do not depart from the main idea of the present disclosure. In addition, various modifications can be made to the present disclosure within the scope of the claims. Embodiments resulting from the appropriate combinations of the technical means disclosed in different embodiments are also included within the technical scope of the present disclosure. In addition, components having the same effect described in the foregoing embodiments may be replaced with one another.

The invention claimed is:

1. A method performed by a User Equipment (UE), the method comprising:
   transmitting a random access preamble using an Early Data Transmission (EDT)-specific Physical Random Access Channel (PRACH) resource;
   receiving a random access response including an uplink (UL) grant;
   transmitting a Radio Resource Control (RRC) connection resume request (RRCconnectionresumerequest) and user data for user plane-early data transmission (UP-EDT) by using the UL grant; and for the UP-EDT, performing actions upon leaving an RRC connected state in a case of an RRC layer of the UE receiving an integrity check failure indication from a Packet Data Convergence Protocol (PDCP) layer of the UE concerning a signaling radio bearer SRB while a timer T300 is running, wherein the integrity check failure indication indicates that an integrity verification of an RRC response message received on the SRB has failed, the integrity check failure indication causes the UE to leave the RRC connected state, and the actions are actions for causing the UE to enter an RRC idle state.

2. A User Equipment (UE), comprising:

a processor; and a memory, storing instructions, wherein when run by the processor, the instructions execute the steps of:

transmitting a random access preamble using an Early Data Transmission (EDT)-specific Physical Random Access Channel (PRACH) resource;

receiving a random access response including an uplink (UL) grant;

transmitting a Radio Resource Control (RRC) connection resume request (RRCconnectionresumerequest) and user data for user plane-early data transmission (UP-EDT) by using the UL grant; and for the UP-EDT, performing actions upon leaving an RRC connected state in a case of an RRC layer of the UE receiving an integrity check failure indication from a Packet Data Convergence Protocol (PDCP) layer of the UE concerning a signaling radio bearer (SRB) while a timer T300 is running, wherein the integrity check failure indication indicates that an integrity verification of an RRC response message received on the SRB has failed, the integrity check failure indication causes the UE to leave the RRC connected state, and the actions are actions for causing the UE to enter an RRC idle state.

\* \* \* \* \*